US012725072B2

(12) United States Patent
Wang et al.

(10) Patent No.: US 12,725,072 B2
(45) Date of Patent: Sep. 1, 2026

(54) PERFORMING QUBIT MAPPING TAKING INTO CONSIDERATION CROSSTALK ERRORS IN DYNAMIC QUANTUM CIRCUITS

(71) Applicant: International Business Machines Corporation, Armonk, NY (US)

(72) Inventors: Derek Wang, New York, NY (US); Elisa Doreen Bäumer, Zurich (CH); Alireza Seif Tabrizi, Adelphi, MD (US)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 18/890,383

(22) Filed: Sep. 19, 2024

(65) Prior Publication Data

US 2026/0087397 A1 Mar. 26, 2026

(51) Int. Cl.
*G06N 10/70* (2022.01)

(52) U.S. Cl.
CPC .................................... *G06N 10/70* (2022.01)

(58) Field of Classification Search
None
See application file for complete search history.

(56) References Cited

U.S. PATENT DOCUMENTS

| | | | | |
|---|---|---|---|---|
| 9,858,531 | B1 * | 1/2018 | Monroe | G06N 10/40 |
| 10,223,643 | B1 * | 3/2019 | Bishop | G06N 10/70 |
| 11,658,660 | B1 * | 5/2023 | Finck | H10N 60/12 327/527 |
| 11,941,483 | B2 | 3/2024 | Hann et al. | |
| 11,960,973 | B2 | 4/2024 | Chen et al. | |
| 2022/0156630 | A1 * | 5/2022 | Schuster | H10N 69/00 |

(Continued)

FOREIGN PATENT DOCUMENTS

WO 2021056115 A1 4/2021

OTHER PUBLICATIONS

V. Servanan and S. M. Saeed, "Graph Neural Networks for Idling Error Mitigation," 2022 IEEE/ACM International Conference on Computer Aided Design (ICCAD), San Diego, CA, USA, 2022, pp. 1-9. (Year: 2022).*

(Continued)

*Primary Examiner* — Daniel F. McMahon
(74) *Attorney, Agent, or Firm* — Joseph P. Curcuru

(57) ABSTRACT

A method, system, and computer program product for performing qubit mapping taking into consideration crosstalk errors in dynamic quantum circuits. A cost function is adjusted by taking into consideration the estimated idle time and the measured crosstalk error of the dynamic quantum circuit. Such a cost function corresponds to a functional relationship between the cost and both the estimated idle time and the measured crosstalk error of the dynamic quantum circuit. The logical qubits of the dynamic quantum circuit are then mapped to the physical qubits on the quantum device based on the adjusted cost function. For example, the logical qubits of the dynamic quantum circuit are mapped to a particular layout of the physical qubits on the quantum device based on a particular value of the cost function. In this manner, qubit mapping is performed by taking into consideration the crosstalk errors in dynamic quantum circuits.

20 Claims, 7 Drawing Sheets

(56) References Cited

U.S. PATENT DOCUMENTS

| | | | | |
|---|---|---|---|---|
| 2022/0207640 | A1* | 6/2022 | Xu | G06Q 30/0284 |
| 2023/0101616 | A1 | 3/2023 | Volkmann et al. | |
| 2023/0401475 | A1* | 12/2023 | Finck | H10N 60/128 |
| 2024/0070513 | A1 | 2/2024 | Shi et al. | |
| 2024/0134711 | A1* | 4/2024 | Fang | G06N 10/60 |
| 2024/0152794 | A1 | 5/2024 | Chiaro et al. | |
| 2024/0171889 | A1* | 5/2024 | Litinski | G06F 8/41 |
| 2025/0252330 | A1* | 8/2025 | Seif Tabrizi | G06N 10/70 |
| 2025/0252337 | A1* | 8/2025 | Seif Tabrizi | G06N 10/70 |
| 2025/0384325 | A1* | 12/2025 | Mitchell | G06N 10/70 |

OTHER PUBLICATIONS

Neven, “Suppressing quantum errors by scaling a surface code logical qubi”, arXiv:2207.06431v2 [quant-ph] Jul. 20, 2022 (Year: 2022).*

Baumer et al., “Efficient Long-Range Entanglement Using Dynamic Circuits,” arXiv:2308.13065v1, Aug. 24, 2023, pp. 1-18.

Baumer et al., “Quntum Fourier Transform Using Dynamic Circuits,” arXiv:2403.09514v2, Mar. 27, 2024, pp. 1-9.

Sivak et al., “Real-Time Quantum Error Correction Beyond Break-Even,” Nature, vol. 616, Apr. 6, 2023, pp. 50-55.

Dasgupta et al., “Characterizing the Reproducibility of Noisy Quantum Circuits,” Entropy, vol. 24, No. 244, 2022, pp. 1-20.

Ding et al., “Systematic Crosstalk Mitigation for Superconducting Qubits via Frequency-Aware Compilation,” 53rd Annual IEEE/ACM International Symposium on Microarchitecture (MICRO), 2020, pp. 201-214.

* cited by examiner

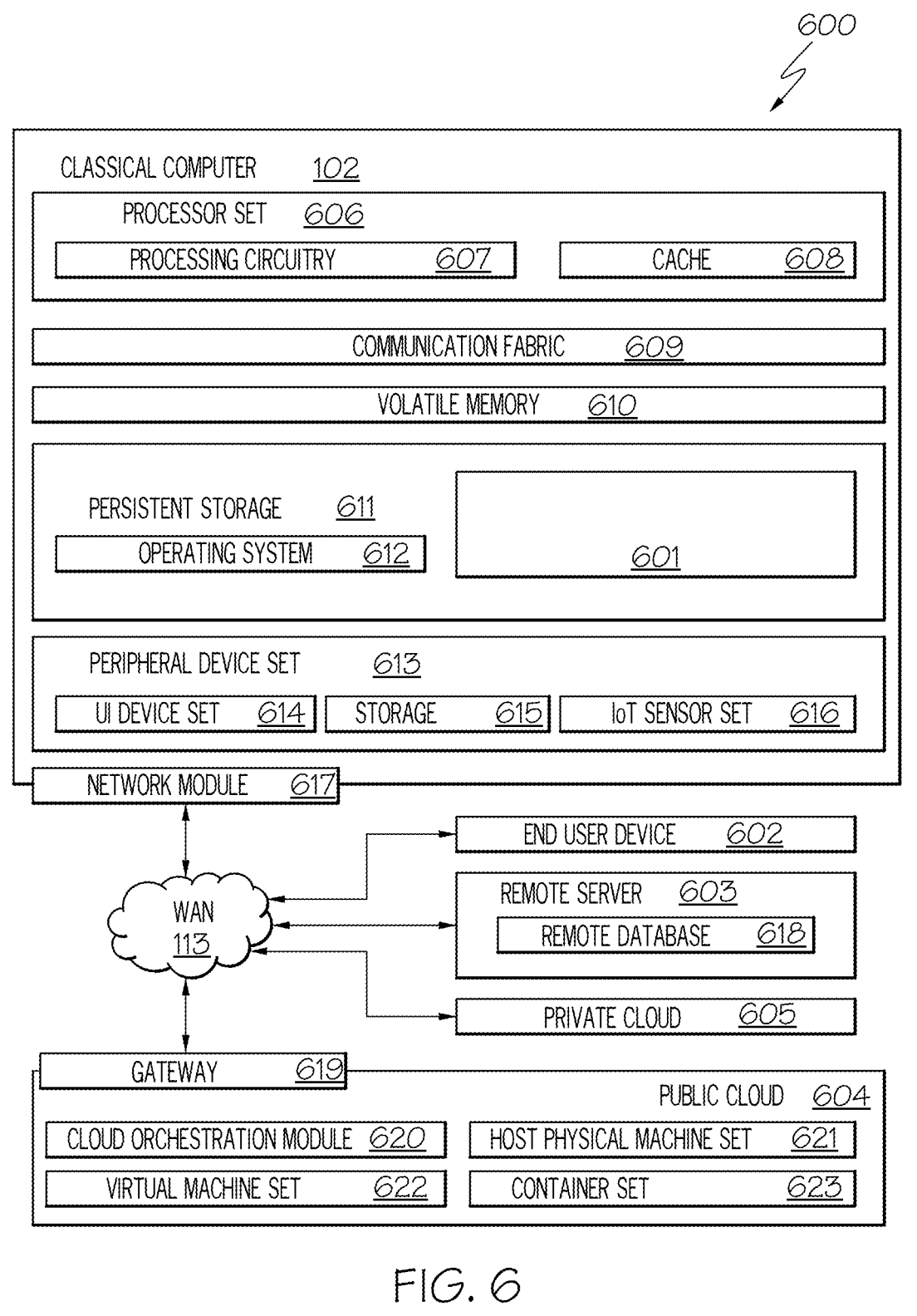

600
CLASSICAL COMPUTER 102
PROCESSOR SET 606
PROCESSING CIRCUITRY 607
CACHE 608
COMMUNICATION FABRIC 609
VOLATILE MEMORY 610
PERSISTENT STORAGE 611
OPERATING SYSTEM 612
601
PERIPHERAL DEVICE SET 613
UI DEVICE SET 614
STORAGE 615
IoT SENSOR SET 616
NETWORK MODULE 617
END USER DEVICE 602
WAN 113
REMOTE SERVER 603
REMOTE DATABASE 618
PRIVATE CLOUD 605
GATEWAY 619
PUBLIC CLOUD 604
CLOUD ORCHESTRATION MODULE 620
HOST PHYSICAL MACHINE SET 621
VIRTUAL MACHINE SET 622
CONTAINER SET 623

FIG. 6

PERFORMING QUBIT MAPPING TAKING INTO CONSIDERATION CROSSTALK ERRORS IN DYNAMIC QUANTUM CIRCUITS

TECHNICAL FIELD

The present disclosure relates generally to qubit mapping, and more particularly to performing qubit mapping taking into consideration crosstalk errors in dynamic quantum circuits.

BACKGROUND

Dynamic quantum circuits are quantum circuits with mid-circuit measurements and feed-forward classical operations which allow such circuits to be adaptive on-the-fly. A mid-circuit measurement is a quantum measurement at an intermediate point in the quantum circuit as opposed to a measurement at the end point of the quantum circuit thereby allowing dynamic adaptations based on the results. Feed-forward classical operations (or simply referred to herein as "feed-forward operations") refer to the real-time adaptation of the quantum circuits based on earlier measurement outcomes.

Dynamic quantum circuits are a fundamental part of utility-scale quantum computation (quantum utility is when a quantum computer is able to perform reliable computations at a scale beyond brute force classical computing methods that provide exact solutions to computational problems), ranging from generating long-range entanglement more efficiently to executing core algorithmic primitives (e.g., quantum Fourier transform) to the foundation of active quantum error correction.

Unfortunately, dynamic quantum circuits are susceptible to certain types of errors, such as crosstalk errors, due to idle times introduced by mid-circuit measurements. Such crosstalk errors due to these idle times are especially damaging to state fidelity (measure of how closely a state or operation matches its intended or ideal state or operation) when qubits are neighboring each other. For example, state fidelity decreases when there are crosstalk errors. Crosstalk error in quantum computing refers to unwanted interaction or interference between qubits, such as during quantum operations. It arises from the imperfect isolation of quantum components, and it leads to unintended effects on neighboring qubits, thereby compromising the fidelity of quantum computations.

There exists many approaches for suppressing the crosstalk errors in dynamic quantum circuits, such as through custom dynamical decoupling pulses. Dynamical decoupling pulses are a series of instantaneous control pulses that are applied periodically to idle qubits. The pulses flip the qubits around the Bloch sphere, which cancels out the effects of noise channels and suppresses decoherence.

However, such approaches do not prevent crosstalk errors from negatively affecting qubit mapping. Qubit mapping involves mapping the logical qubits of the quantum circuit to the physical qubits on the quantum device. Qubit mapping is used to address the connectivity constraints of modern quantum computing devices. For example, when a quantum algorithm involves a quantum operation between two non-adjacent qubits, a long sequence of swap operations may need to be performed to bring the computation to a pair of adjacent qubits. As a result, logical qubits of the quantum circuit are mapped to the physical qubits on the quantum device so as to address the connectivity constraints of modern quantum computing devices.

Unfortunately, current qubit mapping techniques do not consider crosstalk errors in dynamic quantum circuits, which as discussed above, are damaging to state fidelity when qubits are neighboring each other.

SUMMARY

In one embodiment of the present disclosure, a method for performing qubit mapping taking into consideration crosstalk errors in dynamic quantum circuits comprises adjusting a cost function to take into consideration an idle time and a crosstalk error of a dynamic quantum circuit. The method further comprises mapping logical qubits of the dynamic quantum circuit to physical qubits on a quantum device based on the adjusted cost function.

Furthermore, in one embodiment of the present disclosure, the method additionally comprises estimating the idle time of the dynamic quantum circuit during pre-scheduling of the dynamic quantum circuit.

Additionally, in one embodiment of the present disclosure, the idle time of the dynamic quantum circuit is estimated using stored reference values of a readout time, a readout delay, and a feed-forward time during the pre-scheduling of the dynamic quantum circuit.

Furthermore, in one embodiment of the present disclosure, the method additionally comprises estimating the idle time of the dynamic quantum circuit based on sampling different quantum trajectories and averaging total neighboring idle times.

Additionally, in one embodiment of the present disclosure, the method further comprises measuring the crosstalk error of the dynamic quantum circuit.

Furthermore, in one embodiment of the present disclosure, a value of the cost function scales with an amount of the idle time and the crosstalk error of the dynamic quantum circuit, where the logical qubits of the dynamic quantum circuit are mapped to a particular layout of the physical qubits on the quantum device based on a particular value of the cost function.

Additionally, in one embodiment of the present disclosure, the idle time and the crosstalk error of the dynamic quantum circuit are modularly added to a default cost to adjust the cost function.

Other forms of the embodiments of the method described above are in a system and in a computer program product.

Accordingly, embodiments of the present disclosure enable the performance of qubit mapping that takes into consideration the crosstalk errors in dynamic quantum circuits.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 6 illustrates an embodiment of the present disclosure of the hardware configuration of the classical computer which is representative of a hardware environment for practicing the present disclosure.

DETAILED DESCRIPTION

Figure 1:
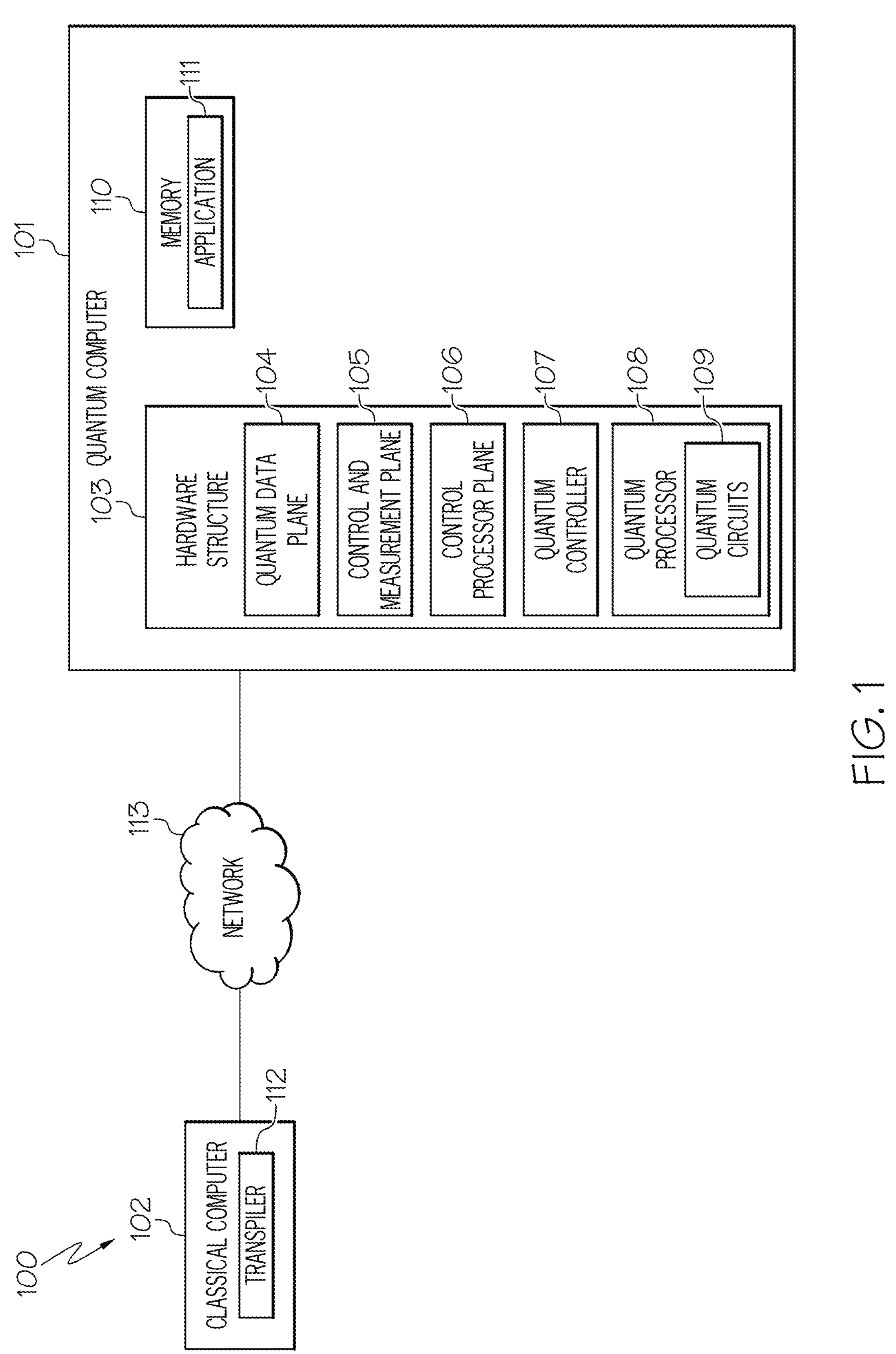
FIG. 1 illustrates a communication system for practicing the principles of the present disclosure in accordance with an embodiment of the present disclosure.

In one embodiment of the present disclosure, a method for performing qubit mapping taking into consideration crosstalk errors in dynamic quantum circuits comprises adjusting a cost function to take into consideration an idle time and a crosstalk error of a dynamic quantum circuit. The method further comprises mapping logical qubits of the dynamic quantum circuit to physical qubits on a quantum device based on the adjusted cost function.

In this manner, qubit mapping is performed in a manner that takes into consideration the crosstalk errors in dynamic quantum circuits.

Furthermore, in one embodiment of the present disclosure, the method additionally comprises estimating the idle time of the dynamic quantum circuit during pre-scheduling of the dynamic quantum circuit.

In this manner, the idle time introduced by mid-circuit measurements of the dynamic quantum circuit can be estimated pre-transpilation.

Additionally, in one embodiment of the present disclosure, the idle time of the dynamic quantum circuit is estimated using stored reference values of a readout time, a readout delay, and a feed-forward time during the pre-scheduling of the dynamic quantum circuit.

In this manner, the idle time introduced by mid-circuit measurements of the dynamic quantum circuit can be estimated pre-transpilation using the stored reference values of the readout time, the readout delay, and the feed-forward time.

Furthermore, in one embodiment of the present disclosure, the method additionally comprises estimating the idle time of the dynamic quantum circuit based on sampling different quantum trajectories and averaging total neighboring idle times.

In this manner, the idle time introduced by mid-circuit measurements of the dynamic quantum circuit can be estimated using a Monte Carlo method.

Additionally, in one embodiment of the present disclosure, the method further comprises measuring the crosstalk error of the dynamic quantum circuit.

In this manner, the crosstalk error of the dynamic quantum circuit can be utilized to adjust the cost function.

Furthermore, in one embodiment of the present disclosure, a value of the cost function scales with an amount of the idle time and the crosstalk error of the dynamic quantum circuit, where the logical qubits of the dynamic quantum circuit are mapped to a particular layout of the physical qubits on the quantum device based on a particular value of the cost function.

In this manner, the qubit mapping is performed in a manner that takes into consideration the crosstalk errors in dynamic quantum circuits, where such a mapping is correlated to the value of the cost function, which is dependent on the idle time and the crosstalk error of the dynamic quantum circuit.

Additionally, in one embodiment of the present disclosure, the idle time and the crosstalk error of the dynamic quantum circuit are modularly added to a default cost to adjust the cost function.

In this manner, the cost function can be dynamically adjusted based on the idle time and the crosstalk error of the dynamic quantum circuit, where the cost function is utilized to perform a particular qubit mapping, such as mapping the logical qubits of the dynamic quantum circuit to a particular layout of the physical qubits on the quantum device based on the value of the adjusted cost function.

Other forms of the embodiments of the method described above are in a system and in a computer program product.

As stated above, dynamic quantum circuits are a fundamental part of utility-scale quantum computation (quantum utility is when a quantum computer is able to perform reliable computations at a scale beyond brute force classical computing methods that provide exact solutions to computational problems), ranging from generating long-range entanglement more efficiently to executing core algorithmic primitives (e.g., quantum Fourier transform) to the foundation of active quantum error correction.

Unfortunately, dynamic quantum circuits are susceptible to certain types of errors, such as crosstalk errors, due to idle times introduced by mid-circuit measurements. Such crosstalk errors due to these idle times are especially damaging to state fidelity (measure of how closely a state or operation matches its intended or ideal state or operation) when qubits are neighboring each other. For example, state fidelity decreases when there are crosstalk errors. Crosstalk error in quantum computing refers to unwanted interaction or interference between qubits, such as during quantum operations. It arises from the imperfect isolation of quantum components, and it leads to unintended effects on neighboring qubits, thereby compromising the fidelity of quantum computations.

There exists many approaches for suppressing the crosstalk errors in dynamic quantum circuits, such as through custom dynamical decoupling pulses. Dynamical decoupling pulses are a series of instantaneous control pulses that are applied periodically to idle qubits. The pulses flip the qubits around the Bloch sphere, which cancels out the effects of noise channels and suppresses decoherence.

However, such approaches do not prevent crosstalk errors from negatively affecting qubit mapping. Qubit mapping involves mapping the logical qubits of the quantum circuit to the physical qubits on the quantum device. Qubit mapping is used to address the connectivity constraints of modern quantum computing devices. For example, when a quantum algorithm involves a quantum operation between two non-adjacent qubits, a long sequence of swap operations may need to be performed to bring the computation to a pair of adjacent qubits. As a result, logical qubits of the quantum circuit are mapped to the physical qubits on the quantum device so as to address the connectivity constraints of modern quantum computing devices.

Unfortunately, current qubit mapping techniques do not consider crosstalk errors in dynamic quantum circuits, which as discussed above, are damaging to state fidelity when qubits are neighboring each other.

The embodiments of the present disclosure provide the means for performing qubit mapping taking into consideration the crosstalk errors in dynamic quantum circuits. In one embodiment, the idle time introduced by a mid-circuit measurement of the dynamic quantum circuit is estimated. In one embodiment, the idle time of the dynamic quantum circuit is estimated during the pre-scheduling of the dynamic quantum circuit. Pre-scheduling, as used herein, refers to pre-transpilation. That is, pre-scheduling occurs prior to the transpilation process occurring, which corresponds to rewriting the dynamic quantum circuit to match the topology of a specific quantum device and/or to optimize the dynamic quantum circuit for execution on present day noisy quantum devices. In one embodiment, the idle time is estimated during the pre-scheduling of the dynamic quantum circuit using stored reference values of a readout time (time to read measurements of the quantum states), a readout delay (delay in reading the measurements of the quantum states) and a feed-forward time (time to perform a feed-forward operation corresponding to using selective measurements during the execution of the dynamic quantum circuit and adapting future operations depending on those measurement results). Additionally, the crosstalk error of the dynamic quantum circuit is measured, such as by gate set tomography, which is employed for crosstalk error characterization that involves the reconstruction of the full quantum state through a series of measurements. A cost function may then be adjusted taking into consideration the estimated idle time and the measured crosstalk error. For example, the idle time and the measured crosstalk error of the dynamic quantum circuit may be modularly added to a default cost to adjust the cost function. The logical qubits of the dynamic quantum circuit are then mapped to the physical qubits on the quantum device based on the adjusted cost function. For example, the value of the cost function scales with an amount of the idle time and the measured crosstalk error of the dynamic quantum circuit, where the logical qubits of the dynamic quantum circuit are mapped to a particular layout of the physical qubits on the quantum device based on a particular value of the cost function. In this manner, qubit mapping is performed by taking into consideration the crosstalk errors in dynamic quantum circuits. These and other features will be discussed in further detail below.

In some embodiments of the present disclosure, the present disclosure comprises a method, system, and computer program product for performing qubit mapping taking into consideration crosstalk errors in dynamic quantum circuits. In one embodiment of the present disclosure, a cost function is adjusted by taking into consideration the estimated idle time and the measured crosstalk error of the dynamic quantum circuit. A cost function, as used herein, refers to a crosstalk aware cost function, which corresponds to a functional relationship between the cost and both the estimated idle time and the measured crosstalk error of the dynamic quantum circuit. Such a cost function is utilized to map the logical qubits of the dynamic quantum circuit and the physical qubits on the quantum device. In one embodiment, the cost function equals a default cost+(idle time of the dynamic quantum circuit)*(measured crosstalk error). In one embodiment, the idle time and the measured crosstalk error of the dynamic quantum circuit are modularly added to a default cost to adjust the cost function. The logical qubits of the dynamic quantum circuit are then mapped to the physical qubits on the quantum device based on the adjusted cost function. For example, the logical qubits of the dynamic quantum circuit are mapped to a particular layout of the physical qubits on the quantum device based on a particular value of the cost function. In this manner, qubit mapping is performed by taking into consideration the crosstalk errors in dynamic quantum circuits.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a quantum computer 101 configured to perform quantum computations, such as the types of computations that harness the collective properties of quantum states, such as superposition, interference, and entanglement, as well as a classical computer 102 in which information is stored in bits that are represented logically by either a 0 (off) or a 1 (on). Examples of classical computer 102 include, but are not limited to, a portable computing unit, a Personal Digital Assistant (PDA), a laptop computer, a mobile device, a tablet personal computer, a smartphone, a mobile phone, a navigation device, a gaming unit, a desktop computer system, a workstation, and the like configured with the capability of connecting to network 113 (discussed below).

In one embodiment, classical computer 102 is used to set up the state of quantum bits in quantum computer 101 and then quantum computer 101 starts the quantum process. Furthermore, in one embodiment, classical computer 102 is configured to perform qubit mapping that takes into consideration the crosstalk errors in dynamic quantum circuits.

In one embodiment, a hardware structure 103 of quantum computer 101 includes a quantum data plane 104, a control and measurement plane 105, a control processor plane 106, a quantum controller 107, and a quantum processor 108. While depicted as being located on a single machine, quantum data plane 104, control and measurement plane 105, and control processor plane 106 may be distributed across multiple computing machines, such as in a cloud computing architecture, and communicate with quantum controller 107, which may be located in close proximity to quantum processor 108.

Quantum data plane 104 includes the physical qubits or quantum bits (basic unit of quantum information in which a qubit is a two-state (or two-level) quantum-mechanical system) and the structures needed to hold them in place. In one embodiment, quantum data plane 104 contains any support circuitry needed to measure the qubits'state and perform gate operations on the physical qubits for a gate-based system or control the Hamiltonian for an analog computer. In one embodiment, control signals routed to the selected qubit(s) set a state of the Hamiltonian. For gate-based systems, since some qubit operations require two qubits, quantum data plane 104 provides a programmable "wiring" network that enables two or more qubits to interact.

Control and measurement plane 105 converts the digital signals of quantum controller 107, which indicates what quantum operations are to be performed, to the analog control signals needed to perform the operations on the qubits in quantum data plane 104. In one embodiment, control and measurement plane 105 converts the analog output of the measurements of qubits in quantum data plane 104 to classical binary data that quantum controller 107 can handle.

Control processor plane 106 identifies and triggers the sequence of quantum gate operations and measurements (which are subsequently carried out by control and measurement plane 105 on quantum data plane 104). These sequences execute the program, provided by quantum processor 108, for implementing a quantum algorithm.

In one embodiment, control processor plane 106 runs the quantum error correction algorithm (if quantum computer 101 is error corrected).

In one embodiment, quantum processor 108 uses qubits to perform computational tasks. In the particular realms where quantum mechanics operate, particles of matter can exist in multiple states, such as an "on" state, an "off" state, and both "on" and "off" states simultaneously. Quantum processor 108 harnesses these quantum states of matter to output signals that are usable in data computing.

In one embodiment, quantum processor 108 performs algorithms which conventional processors are incapable of performing efficiently.

In one embodiment, quantum processor 108 includes one or more quantum circuits 109. Quantum circuits 109 may collectively or individually be referred to as quantum circuits 109 or quantum circuit 109, respectively. A "quantum circuit 109," as used herein, refers to a model for quantum computation in which a computation is a sequence of quantum logic gates, measurements, initializations of qubits to known values and possibly other actions. A "quantum logic gate," as used herein, is a reversible unitary transformation on at least one qubit. Quantum logic gates, in contrast to classical logic gates, are all reversible. Examples of quantum logic gates include RX (performs $e^{i\theta X/2}$, which corresponds to a rotation of the qubit state around the X-axis by the given angle theta θ on the Bloch sphere), RY (performs $e^{i\theta Y/2}$, which corresponds to a rotation of the qubit state around the Y-axis by the given angle theta θ on the Bloch sphere), RXX (performs the operation $e^{(-i\theta X \otimes X/2)}$ on the input qubit), RZZ (takes in one input, an angle theta θ expressed in radians, and it acts on two qubits), etc. In one embodiment, quantum circuits 109 are written such that the horizontal axis is time, starting at the left-hand side and ending at the right-hand side.

Furthermore, in one embodiment, quantum circuit 109 corresponds to a command structure provided to control processor plane 106 on how to operate control and measurement plane 105 to run the algorithm on quantum data plane 104/quantum processor 108.

Furthermore, quantum computer 101 includes memory 110, which may correspond to quantum memory. In one embodiment, memory 110 is a set of quantum bits that store quantum states for later retrieval. The state stored in quantum memory 110 can retain quantum superposition.

In one embodiment, memory 110 stores an application 111 that may be configured to implement one or more of the methods described herein in accordance with one or more embodiments. For example, application 111 may implement a program for performing qubit mapping that takes into consideration the crosstalk errors in dynamic quantum circuits as discussed further below in connection with FIGS. 2, 3A-3B, 4-5 and 7. Examples of memory 110 include light quantum memory, solid quantum memory, gradient echo memory, electromagnetically induced transparency, etc.

Furthermore, in one embodiment, classical computer 102 includes a "transpiler 112," which as used herein, is configured to rewrite an abstract quantum circuit 109 into a functionally equivalent one that matches the constraints and characteristics of a specific target quantum device. In one embodiment, transpiler 112 (e.g., qiskit transpiler, where Qiskit® is an open-source software development kit for working with quantum computers at the level of circuits, pulses, and algorithms) rewrites a given input circuit to match the topology of a specific quantum device and/or to optimize the quantum circuit for execution. In one embodiment, transpiler 112 converts a trained machine learning model upon execution on quantum hardware 103 to its elementary instructions and maps it to physical qubits.

In one embodiment, quantum machine learning models are based on variational quantum circuits 109. Such models consist of data encoding, processing parameterized with trainable parameters, and measurement/post-processing.

In one embodiment, the number of qubits (basic unit of quantum information in which a qubit is a two-state (or two-level) quantum-mechanical system) is determined by the number of features in the data. This processing stage may include multiple layers of parameterized gates. As a result, in one embodiment, the number of trainable parameters is (number of features)*(number of layers).

Furthermore, as shown in FIG. 1, classical computer 102, which is used to set up the state of quantum bits in quantum computer 101, may be connected to quantum computer 101 via network 113.

Network 113 may be, for example, a quantum network, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, a cellular network and various combinations thereof, etc. Other networks, whose descriptions are omitted here for brevity, may also be used in conjunction with system 100 of FIG. 1 without departing from the scope of the present disclosure.

Furthermore, classical computer 102 is configured to perform qubit mapping that takes into consideration the crosstalk errors in dynamic quantum circuits as discussed further below in connection with FIGS. 2, 3A-3B, 4-5 and 7. A description of the software components of classical computer 102 is provided below in connection with FIG. 2 and a description of the hardware configuration of classical computer 102 is provided further below in connection with FIG. 6.

System 100 is not to be limited in scope to any one particular network architecture. System 100 may include any number of quantum computers 101, classical computers 102, and networks 113.

A discussion regarding the software components used by classical computer 102 for performing qubit mapping that takes into consideration the crosstalk errors in dynamic quantum circuits is provided below in connection with FIG. 2.

Figure 2:
FIG. 2 is a diagram of the software components of the classical computer for performing qubit mapping that takes into consideration the crosstalk errors in dynamic quantum circuits in accordance with an embodiment of the present disclosure.

FIG. 2 is a diagram of the software components of classical computer 102 (FIG. 1) for performing qubit mapping that takes into consideration the crosstalk errors in dynamic quantum circuits in accordance with an embodiment of the present disclosure.

Referring to FIG. 2, in conjunction with FIG. 1, classical computer 102 includes measurement engine 201 configured to estimate the idle time of the dynamic quantum circuit (e.g., quantum circuit 109).

In one embodiment, the idle time of the dynamic quantum circuit is introduced by mid-circuit measurements. In one embodiment, the idle time of the dynamic quantum circuit is estimated by measurement engine 201 during the pre-scheduling of the dynamic quantum circuit. Pre-scheduling, as used herein, refers to pre-transpilation. That is, pre-scheduling occurs prior to the transpilation process occurring, which corresponds to rewriting the dynamic quantum circuit to match the topology of a specific quantum device and/or to optimize the dynamic quantum circuit for execution on present day noisy quantum devices.

Figure 3A:
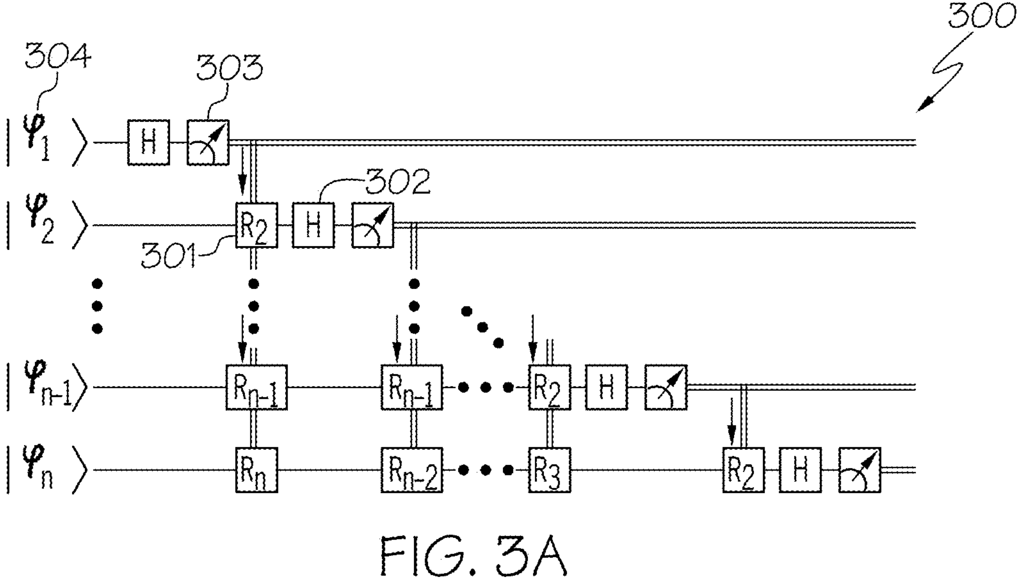
FIGS. 3A-3B illustrate estimating the idle time during the pre-scheduling of the dynamic quantum circuit in accordance with an embodiment of the present disclosure.
Figure 3B:
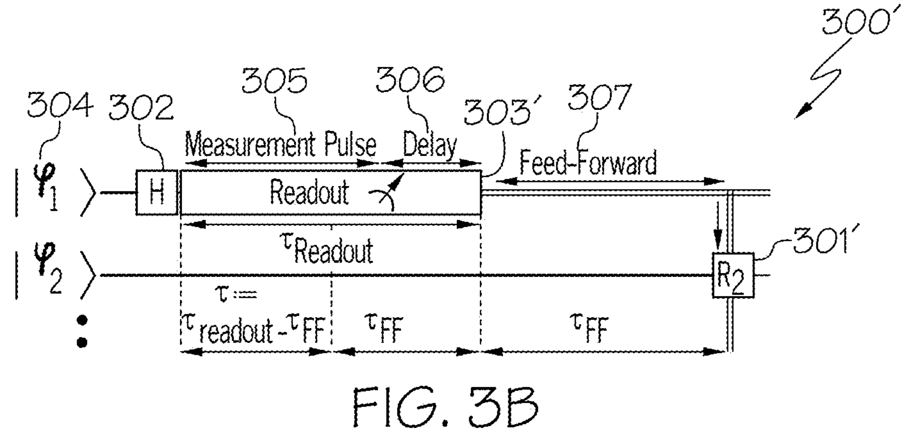

In one embodiment, measurement engine 201 estimates the idle time during the pre-scheduling of the dynamic quantum circuit using stored reference values of a readout time (time to read measurements of the quantum states), a readout delay (delay in reading the measurements of the quantum states) and a feed-forward time (time to perform a feed-forward operation corresponding to using selective measurements during the execution of the dynamic quantum circuit and adapting future operations depending on those measurement results) as illustrated in FIGS. 3A-3B.

FIGS. 3A-3B illustrate estimating the idle time during the pre-scheduling of the dynamic quantum circuit in accordance with an embodiment of the present disclosure.

As shown in FIG. 3A, FIG. 3A illustrates an original dynamic quantum circuit 300 that includes rotations gates 301 (identified by "R"). Rotation gates 301 are quantum operations that rotate a qubit's state around a specific axis on the Bloch sphere. Examples of rotation gates 301 include the x-axis rotation gate, which rotates a qubit around the x-axis of the Bloch sphere by an angle θ, the y-axis rotation gate, which rotates a qubit around the y-axis by an angle θ, and the z-axis rotation gate, which rotates a qubit around the z-axis by an angle θ. Furthermore, dynamic quantum circuit 300 includes Hadamard gates 302 (identified by "H"), which are logic gates that turn a state of $|0\rangle$ or $|1\rangle$ into a superposition of $|0\rangle$ and $|1\rangle$. Additionally, dynamic quantum circuit 300 includes measurement operations 303, such as mid-circuit measurements of dynamic quantum circuit 300, using logical qubits 304.

As discussed above, in one embodiment, measurement engine 201 estimates the idle time of the dynamic quantum circuit, such as introduced by mid-circuit measurements, during the pre-scheduling (pre-transpilation) of the dynamic quantum circuit. The pre-scheduling of dynamic quantum circuit 300 is illustrated in FIG. 3B.

As shown in FIG. 3B, the pre-scheduled dynamic quantum circuit 300' (pre-scheduling of dynamic quantum circuit 300 of FIG. 3A) has its idle time estimated using the stored reference values of a readout time 305 (time to read measurements of the quantum states) (identified as "measurement pulse" in FIG. 3B), a readout delay 306 (delay in reading the measurements of the quantum states) (identified as "delay" in FIG. 3B) and a feed-forward time 307 (time to perform a feed-forward operation corresponding to using selective measurements during the execution of the dynamic quantum circuit and adapting future operations depending on those measurement results) (identified as "feed forward" in FIG. 3B).

In one embodiment, readout time 305 and readout delay 306 are measured by measurement engine 201 using measurement operation 303' (identified as "readout" in FIG. 3B). In one embodiment, the duration of time for outputting a read measurement performed by measurement operation 303' is $\tau_{readout}$, which consists of readout time 305 and readout delay 306. Furthermore, the duration of time to perform a feed-forward operation involving forwarding such a measurement to the next gate, such as rotation gate 301', is $\tau_{FF}$. Furthermore, as shown in FIG. 3B, τ is :=(equal to by definition) $\tau_{readout}-\tau_{FF}$. In one embodiment, such reference values of readout time 305, readout delay 306, and feed-forward time 307 are measured and stored by measurement engine 201 using various tools, such as, but not limited to, Qiskit®, qHIPSTER, Quipper, ScaffCC, etc.

Returning to FIG. 2, in one embodiment, measurement engine 201 estimates the idle time of the dynamic quantum circuit (e.g., quantum circuit 109) based on sampling different quantum trajectories and averaging the total neighborhood idle times. In one embodiment, such quantum trajectories correspond to the calculated system states as a function of time. In one embodiment, such an approach is performed by measurement engine 201 using a Monte Carlo method (computational algorithm that relies on repeated random sampling to obtain numerical results) as illustrated in FIG. 4.

Figure 4:
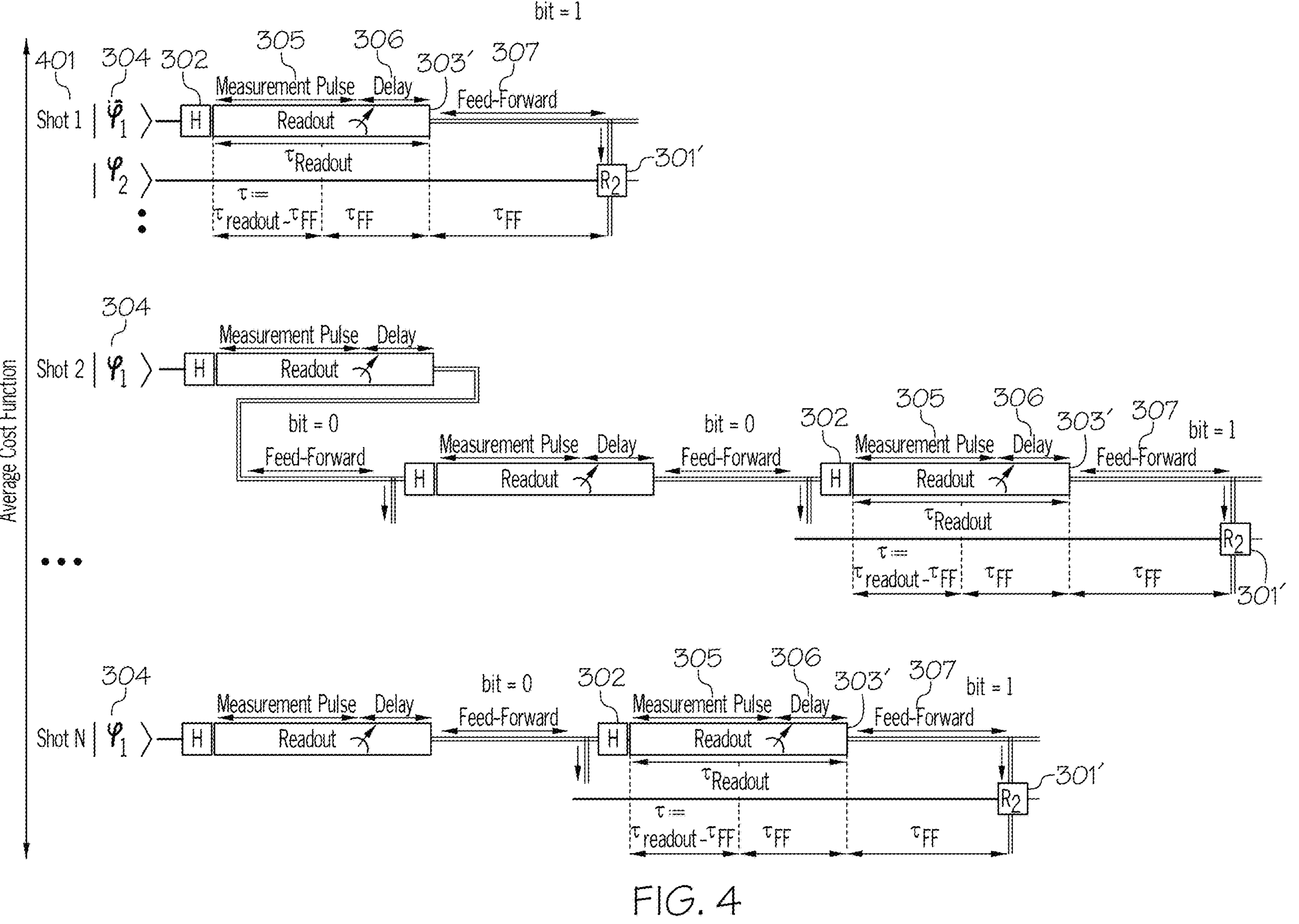
FIG. 4 illustrates sampling different quantum trajectories using a Monte Carlo method during pre-scheduling of the dynamic quantum circuit in accordance with an embodiment of the present disclosure.

FIG. 4 illustrates sampling different quantum trajectories using a Monte Carlo method during pre-scheduling of the dynamic quantum circuit in accordance with an embodiment of the present disclosure.

As shown in FIG. 4, in conjunction with FIG. 3B, such a Monte Carlo method performs a "repeat until success" method, where the simulation averages the results to estimate the average cost function (discussed further below), which includes the idle time of the dynamic quantum circuit as discussed below. In one embodiment, such a repeat until success process occurs over a series of shots 401 (e.g., shots 1 . . . shot N, where N is a positive integer number) while the bit=0. A shot, as used herein, refers to single execution of a quantum algorithm on a quantum processing unit (e.g., quantum processor 108).

Returning to FIG. 2, additionally, in one embodiment, measurement engine 201 measures the crosstalk error of the dynamic quantum circuit (e.g., quantum circuit 109). In one embodiment, measurement engine 201 measures the crosstalk error of the dynamic quantum circuit by gate set tomography, which is employed for crosstalk error characterization that involves the reconstruction of the full quantum state through a series of measurements. In one embodiment, the gate set tomography is implemented by running a series of two-qubit quantum circuits with parallel, single-qubit gates in each layer. The measured results are then used to fit models, such as crosstalk-free models that assume that each gate can be described by a single-qubit process matrix.

In another embodiment, measurement engine 201 measures the crosstalk error of the dynamic quantum circuit (e.g., quantum circuit 109) using randomized benchmarking and simultaneous randomized benchmarking protocols. In one embodiment, measurement engine 201 applies these protocols to experimental simulations on the dynamic quantum circuits to validate the presence of crosstalk. The dynamic of the crosstalk error models can be evaluated by comparing error variations among the dynamic quantum circuits.

In one embodiment, measurement engine 201 measures the crosstalk error of the dynamic quantum circuit (e.g., quantum circuit 109) using quantum detector tomography, which verifies noise in measurement readout errors. Such verified noise can be used to characterize and quantify the crosstalk error.

In one embodiment, measurement engine 201 measures the crosstalk error of the dynamic quantum circuit (e.g., quantum circuit 109) using quantum state tomography, which is employed for crosstalk error characterization that involves the reconstruction of the full quantum state through a series of measurements. In one embodiment, the quantum state tomography technique allows for a detailed examination of the density matrix, revealing crosstalk-induced deviations from the ideal quantum states.

In one embodiment, measurement engine 201 measures the crosstalk error of the dynamic quantum circuit (e.g., quantum circuit 109) using positive operator-valued measure (POVM) techniques by characterizing the measurement processes.

Furthermore, in one embodiment, measurement engine 201 adjusts a cost function to take into consideration the estimated idle time and the measured crosstalk error of the dynamic quantum circuit. A cost function, as used herein, refers to a crosstalk aware cost function, which corresponds to a functional relationship between the cost and both the estimated idle time and the measured crosstalk error of the dynamic quantum circuit. Such a cost function is utilized to map the logical qubits of the dynamic quantum circuit (e.g., quantum circuit 109) to the physical qubits on the quantum device (e.g., quantum computer 101) as discussed below. In one embodiment, the cost function equals a default cost+(idle time of the dynamic quantum circuit)*(measured crosstalk error).

In one embodiment, measurement engine 201 modularly adds the idle time of the dynamic quantum circuit and the measured crosstalk error to a default cost to adjust the cost function. In one embodiment, the value of the default cost is user-designated.

In one embodiment, the value of the cost function scales with an amount of the idle time and the measured crosstalk error of the dynamic quantum circuit.

Classical computer 102 further includes mapping engine 202 configured to map the logical qubits of the dynamic quantum circuit to the physical qubits on the quantum device (e.g., quantum computer 101) based on the adjusted cost function.

Figure 5:
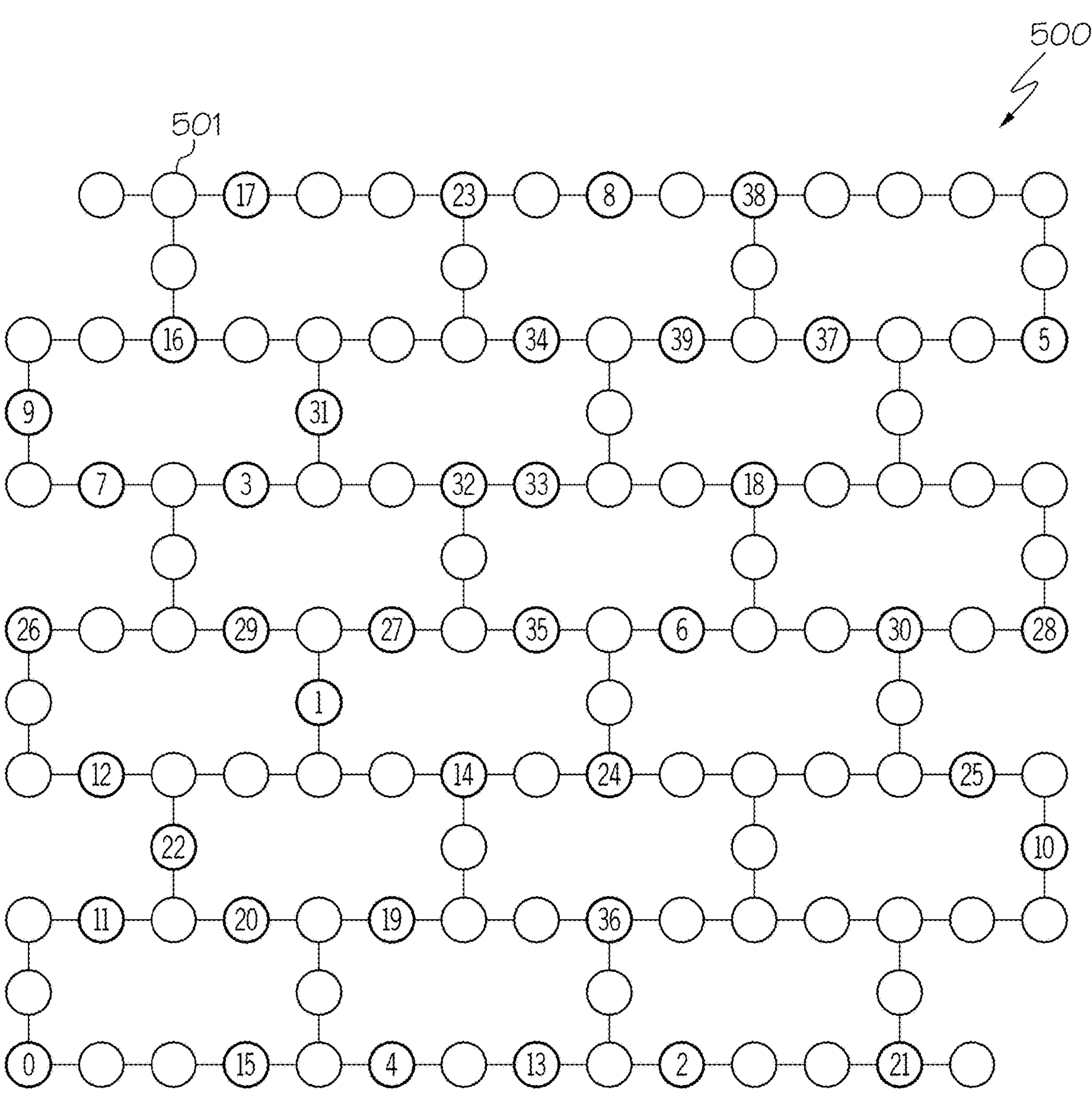
FIG. 5 illustrates the logical qubits of the dynamic quantum circuit being mapped to a particular layout of the physical qubits on the quantum device based on a particular value of the cost function in accordance with an embodiment of the present disclosure.

In one embodiment, the logical qubits of the dynamic quantum circuit are mapped to a particular layout of the physical qubits on the quantum device based on a particular value of the cost function as illustrated in FIG. 5.

FIG. 5 illustrates the logical qubits (e.g., qubits 304 of FIG. 3B) of the dynamic quantum circuit (e.g., dynamic quantum circuit 300' of FIG. 3B) being mapped to a particular layout (e.g., layout 500) of the physical qubits (e.g., qubits 501) on the quantum device (e.g., quantum computer 101) based on a particular value of the cost function in accordance with an embodiment of the present disclosure.

Referring to FIG. 5, in conjunction with FIG. 3B, logical qubits 304 of dynamic quantum circuit 300' are mapped to a particular layout 500 of physical qubits 501 on the quantum device (e.g., quantum device 101) based on a particular value of the cost function.

In one embodiment, such a mapping is performed by mapping engine 202 based on a series of layouts 500 of physical qubits 501 associated with various values of the cost function. In one embodiment, mappings between the layouts 500 of physical qubits 501 and the values of the cost function are stored in a data structure (e.g., table). In one embodiment, mapping engine 202 accesses such a data structure to identify a particular layout 500 of physical qubits 501 based on a value of the cost function in order to map logical qubits 304 of dynamic quantum circuit 300' to a particular layout 500 of physical qubits 501 on the quantum device (e.g., quantum device 101). In one embodiment, such a data structure resides within the storage device of classical computer 102. In one embodiment, such a data structure is populated by an expert.

In this manner, qubit mapping is performed by taking into consideration the crosstalk errors in dynamic quantum circuits.

A further description of these and other functions is provided below in connection with the discussion of the method for performing qubit mapping that takes into consideration the crosstalk errors in dynamic quantum circuits.

Prior to the discussion of the method for performing qubit mapping that takes into consideration the crosstalk errors in dynamic quantum circuits, a description of the hardware configuration of classical computer 102 (FIG. 1) is provided below in connection with FIG. 6.

Referring now to FIG. 6, in conjunction with FIG. 1, FIG. 6 illustrates an embodiment of the present disclosure of the hardware configuration of classical computer 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code 601 involved in performing the inventive methods, such as performing qubit mapping that takes into consideration the crosstalk errors in dynamic quantum circuits. In addition to block 601, computing environment 600 includes, for example, classical computer 102, network 113, such as a wide area network (WAN), end user device (EUD) 602, remote server 603, public cloud 604, and private cloud 605. In this embodiment, classical computer 102 includes processor set 606 (including processing circuitry 607 and cache 608), communication fabric 609, volatile memory 610, persistent storage 611 (including operating system 612 and block 601, as identified above), peripheral device set 613 (including user interface (UI) device set 614, storage 615, and Internet of Things (IoT) sensor set 616), and network module 617. Remote server 603 includes remote database 618. Public cloud 604 includes gateway 619, cloud orchestration module 620, host physical machine set 621, virtual machine set 622, and container set 623.

Classical computer 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 618. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically classical computer 102, to keep the presentation as simple as possible. Classical computer 102 may be located in a cloud, even though it is not shown in a cloud in FIG. 6. On the other hand, classical computer 102 is not required to be in a cloud except to any extent as may be affirmatively indicated.

Processor set 606 includes one, or more, computer processors of any type now known or to be developed in the future. Processing circuitry 607 may be distributed over multiple packages, for example, multiple, coordinated integrated circuit chips. Processing circuitry 607 may implement multiple processor threads and/or multiple processor cores. Cache 608 is memory that is located in the processor chip package(s) and is typically used for data or code that should be available for rapid access by the threads or cores running on processor set 606. Cache memories are typically organized into multiple levels depending upon relative proximity to the processing circuitry. Alternatively, some, or all, of the cache for the processor set may be located "off chip." In some computing environments, processor set 606 may be designed for working with qubits and performing quantum computing.

Computer readable program instructions are typically loaded onto classical computer 102 to cause a series of operational steps to be performed by processor set 606 of classical computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 608 and the other storage media discussed below. The program instructions, and associated data, are accessed by processor set 606 to control and direct performance of the inventive methods. In computing environment 600, at least some of the instructions for performing the inventive methods may be stored in block 601 in persistent storage 611.

Communication fabric 609 is the signal conduction paths that allow the various components of classical computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 610 is any type of volatile memory now known or to be developed in the future. Examples include dynamic type random access memory (RAM) or static type RAM. Typically, the volatile memory is characterized by random access, but this is not required unless affirmatively indicated. In classical computer 102, the volatile memory 610 is located in a single package and is internal to classical computer 102, but, alternatively or additionally, the volatile memory may be distributed over multiple packages and/or located externally with respect to classical computer 102.

Persistent Storage 611 is any form of non-volatile storage for computers that is now known or to be developed in the future. The non-volatility of this storage means that the stored data is maintained regardless of whether power is being supplied to classical computer 102 and/or directly to persistent storage 611. Persistent storage 611 may be a read only memory (ROM), but typically at least a portion of the persistent storage allows writing of data, deletion of data and re-writing of data. Some familiar forms of persistent storage include magnetic disks and solid state storage devices. Operating system 612 may take several forms, such as various known proprietary operating systems or open source Portable Operating System Interface type operating systems that employ a kernel. The code included in block 601 typically includes at least some of the computer code involved in performing the inventive methods.

Peripheral device set 613 includes the set of peripheral devices of classical computer 102. Data communication connections between the peripheral devices and the other components of classical computer 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 614 may include components such as a display screen, speaker, microphone, wearable devices (such as goggles and smart watches), keyboard, mouse, printer, touchpad, game controllers, and haptic devices. Storage 615 is external storage, such as an external hard drive, or insertable storage, such as an SD card. Storage 615 may be persistent and/or volatile. In some embodiments, storage 615 may take the form of a quantum computing storage device for storing data in the form of qubits. In embodiments where classical computer 102 is required to have a large amount of storage (for example, where classical computer 102 locally stores and manages a large database) then this storage may be provided by peripheral storage devices designed for storing very large amounts of data, such as a storage area network (SAN) that is shared by multiple, geographically distributed computers. IoT sensor set 616 is made up of sensors that can be used in Internet of Things applications. For example, one sensor may be a thermometer and another sensor may be a motion detector.

Network module 617 is the collection of computer software, hardware, and firmware that allows classical computer 102 to communicate with other computers through WAN 113. Network module 617 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 617 are performed on the same physical hardware device. In other embodiments (for example, embodiments that utilize software-defined networking (SDN)), the control functions and the forwarding functions of network module 617 are performed on physically separate devices, such that the control functions manage several different network hardware devices. Computer readable program instructions for performing the inventive methods can typically be downloaded to classical computer 102 from an external computer or external storage device through a network adapter card or network interface included in network module 617.

WAN 113 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 602 is any computer system that is used and controlled by an end user (for example, a customer of an enterprise that operates classical computer 102), and may take any of the forms discussed above in connection with classical computer 102. EUD 602 typically receives helpful and useful data from the operations of classical computer 102. For example, in a hypothetical case where classical computer 102 is designed to provide a recommendation to an end user, this recommendation would typically be communicated from network module 617 of classical computer 102 through WAN 113 to EUD 602. In this way, EUD 602 can display, or otherwise present, the recommendation to an end user. In some embodiments, EUD 602 may be a client device, such as thin client, heavy client, mainframe computer, desktop computer and so on.

Remote server 603 is any computer system that serves at least some data and/or functionality to classical computer 102. Remote server 603 may be controlled and used by the same entity that operates classical computer 102. Remote server 603 represents the machine(s) that collect and store helpful and useful data for use by other computers, such as classical computer 102. For example, in a hypothetical case where classical computer 102 is designed and programmed to provide a recommendation based on historical data, then this historical data may be provided to classical computer 102 from remote database 618 of remote server 603.

Public cloud 604 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 604 is performed by the computer hardware and/or software of cloud orchestration module 620. The computing resources provided by public cloud 604 are typically implemented by virtual computing environments that run on various computers making up the computers of host physical machine set 621, which is the universe of physical computers in and/or available to public cloud 604. The virtual computing environments (VCEs) typically take the form of virtual machines from virtual machine set 622 and/or containers from container set 623. It is understood that these VCEs may be stored as images and may be transferred among and between the various physical machine hosts, either as images or after instantiation of the VCE. Cloud orchestration module 620 manages the transfer and storage of images, deploys new instantiations of VCEs and manages active instantiations of VCE deployments. Gateway 619 is the collection of computer software, hardware, and firmware that allows public cloud 604 to communicate through WAN 113.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 605 is similar to public cloud 604, except that the computing resources are only available for use by a single enterprise. While private cloud 605 is depicted as being in communication with WAN 113 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 604 and private cloud 605 are both part of a larger hybrid cloud.

Block 601 further includes the software components discussed above in connection with FIGS. 2, 3A-3B and 4-5 to perform qubit mapping that takes into consideration the crosstalk errors in dynamic quantum circuits. In one embodiment, such components may be implemented in hardware. The functions discussed above performed by such components are not generic computer functions. As a result, classical computer 102 is a particular machine that is the result of implementing specific, non-generic computer functions.

In one embodiment, the functionality of such software components of classical computer 102, including the functionality for performing qubit mapping that takes into consideration the crosstalk errors in dynamic quantum circuits, may be embodied in an application specific integrated circuit.

As stated above, dynamic quantum circuits are a fundamental part of utility-scale quantum computation (quantum utility is when a quantum computer is able to perform reliable computations at a scale beyond brute force classical computing methods that provide exact solutions to computational problems), ranging from generating long-range entanglement more efficiently to executing core algorithmic primitives (e.g., quantum Fourier transform) to the foundation of active quantum error correction. Unfortunately, dynamic quantum circuits are susceptible to certain types of errors, such as crosstalk errors, due to idle times introduced by mid-circuit measurements. Such crosstalk errors due to these idle times are especially damaging to state fidelity (measure of how closely a state or operation matches its intended or ideal state or operation) when qubits are neighboring each other. For example, state fidelity decreases when there are crosstalk errors. Crosstalk error in quantum computing refers to unwanted interaction or interference between qubits, such as during quantum operations. It arises from the imperfect isolation of quantum components, and it leads to unintended effects on neighboring qubits, thereby compromising the fidelity of quantum computations. There exists many approaches for suppressing the crosstalk errors in dynamic quantum circuits, such as through custom dynamical decoupling pulses. Dynamical decoupling pulses are a series of instantaneous control pulses that are applied periodically to idle qubits. The pulses flip the qubits around the Bloch sphere, which cancels out the effects of noise channels and suppresses decoherence. However, such approaches do not prevent crosstalk errors from negatively affecting qubit mapping. Qubit mapping involves mapping the logical qubits of the quantum circuit to the physical qubits on the quantum device. Qubit mapping is used to address the connectivity constraints of modern quantum computing devices. For example, when a quantum algorithm involves a quantum operation between two non-adjacent qubits, a long sequence of swap operations may need to be performed to bring the computation to a pair of adjacent qubits. As a result, logical qubits of the quantum circuit are mapped to the physical qubits on the quantum device so as to address the connectivity constraints of modern quantum computing devices. Unfortunately, current qubit mapping techniques do not consider crosstalk errors in dynamic quantum circuits, which as discussed above, are damaging to state fidelity when qubits are neighboring each other.

The embodiments of the present disclosure provide the means for performing qubit mapping taking into consideration the crosstalk errors in dynamic quantum circuits as discussed below in connection with FIG. 7.

Figure 7:
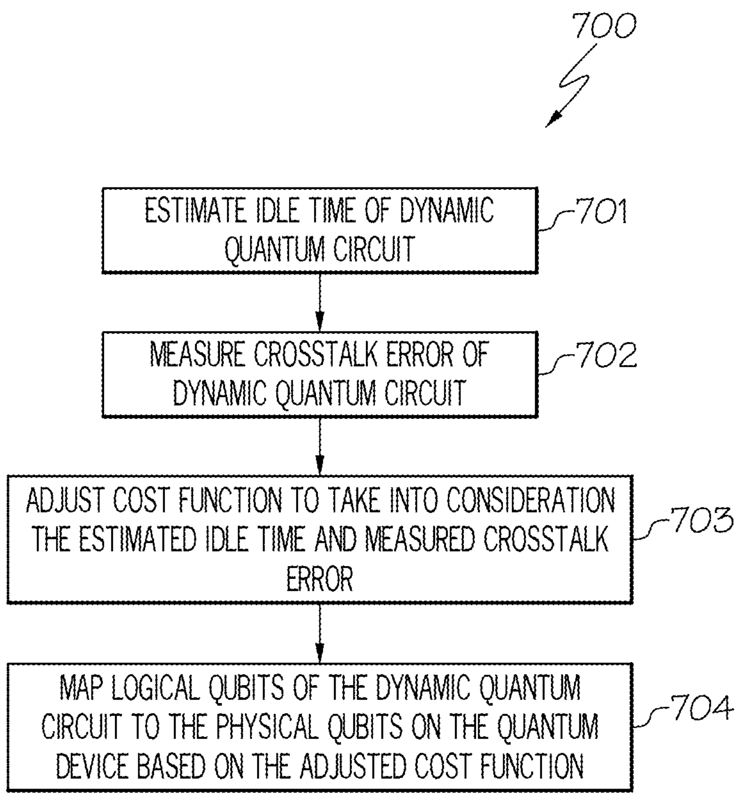
FIG. 7 is a flowchart of a method for performing qubit mapping taking into consideration the crosstalk errors in dynamic quantum circuits in accordance with an embodiment of the present disclosure.

FIG. 7 is a flowchart of a method 700 for performing qubit mapping taking into consideration the crosstalk errors in dynamic quantum circuits in accordance with an embodiment of the present disclosure.

Referring to FIG. 7, in conjunction with FIGS. 1-2, 3A-3B and 4-6, in step 701, measurement engine 201 of classical computer 102 estimates the idle time of the dynamic quantum circuit (e.g., quantum circuit 109).

As discussed above, in one embodiment, the idle time of the dynamic quantum circuit is introduced by mid-circuit measurements. In one embodiment, the idle time of the dynamic quantum circuit is estimated by measurement engine 201 during the pre-scheduling of the dynamic quantum circuit. Pre-scheduling, as used herein, refers to pre-transpilation. That is, pre-scheduling occurs prior to the transpilation process occurring, which corresponds to rewriting the dynamic quantum circuit to match the topology of a specific quantum device and/or to optimize the dynamic quantum circuit for execution on present day noisy quantum devices.

In one embodiment, measurement engine 201 estimates the idle time during the pre-scheduling of the dynamic quantum circuit using stored reference values of a readout time (time to read measurements of the quantum states), a readout delay (delay in reading the measurements of the quantum states) and a feed-forward time (time to perform a feed-forward operation corresponding to using selective measurements during the execution of the dynamic quantum circuit and adapting future operations depending on those measurement results) as illustrated in FIGS. 3A-3B.

As shown in FIG. 3A, FIG. 3A illustrates an original dynamic quantum circuit 300 that includes rotation gates 301 (identified by "R"). Rotation gates 301 are quantum operations that rotate a qubit's state around a specific axis on the Bloch sphere. Examples of rotation gates 301 include the x-axis rotation gate, which rotates a qubit around the x-axis of the Bloch sphere by an angle θ, the y-axis rotation gate, which rotates a qubit around the y-axis by an angle θ, and the z-axis rotation gate, which rotates a qubit around the z-axis by an angle θ. Furthermore, dynamic quantum circuit 300 includes Hadamard gates 302 (identified by "H"), which are logic gates that turn a state of $|0\rangle$ or $|1\rangle$ into a superposition of $|0\rangle$ and $|1\rangle$. Additionally, dynamic quantum circuit 300 includes measurement operations 303, such as mid-circuit measurements of dynamic quantum circuit 300, using logical qubits 304.

As discussed above, in one embodiment, measurement engine 201 estimates the idle time of the dynamic quantum circuit, such as introduced by mid-circuit measurements, during the pre-scheduling (pre-transpilation) of the dynamic quantum circuit. The pre-scheduling of dynamic quantum circuit 300 is illustrated in FIG. 3B.

As shown in FIG. 3B, the pre-scheduled dynamic quantum circuit 300' (pre-scheduling of dynamic quantum circuit 300 of FIG. 3A) has its idle time estimated using the stored reference values of a readout time 305 (time to read measurements of the quantum states) (identified as "measurement pulse" in FIG. 3B), a readout delay 306 (delay in reading the measurements of the quantum states) (identified as "delay" in FIG. 3B) and a feed-forward time 307 (time to perform a feed-forward operation corresponding to using selective measurements during the execution of the dynamic quantum circuit and adapting future operations depending on those measurement results) (identified as "feed forward" in FIG. 3B).

In one embodiment, readout time 305 and readout delay 306 are measured by measurement engine 201 using measurement operation 303' (identified as "readout" in FIG. 3B). In one embodiment, the duration of time for outputting a read measurement performed by measurement operation 303' is $\tau_{readout}$, which consists of readout time 305 and readout delay 306. Furthermore, the duration of time to perform a feed-forward operation involving forwarding such a measurement to the next gate, rotation gate 301', is $\tau_{FF}$. Furthermore, as shown in FIG. 3B, τ is :=(equal to by definition) $\tau_{readout}$-$\tau_{FF}$. In one embodiment, such reference values of readout time 305, readout delay 306, and feed-forward time 307 are measured and stored by measurement engine 201 using various tools, such as, but not limited to, Qiskit®, qHIPSTER, Quipper, ScaffCC, etc.

Furthermore, in one embodiment, measurement engine 201 estimates the idle time of the dynamic quantum circuit (e.g., quantum circuit 109) based on sampling different quantum trajectories and averaging the total neighborhood idle times. In one embodiment, such quantum trajectories correspond to the calculated system states as a function of time. In one embodiment, such an approach is performed by measurement engine 201 using a Monte Carlo method (computational algorithm that relies on repeated random sampling to obtain numerical results) as illustrated in FIG. 4.

As shown in FIG. 4, in conjunction with FIG. 3B, such a Monte Carlo method performs a "repeat until success" method, where the simulation averages the results to estimate the average cost function, which includes the idle time of the dynamic quantum circuit. In one embodiment, such a repeat until success process occurs over a series of shots 401 (e.g., shots 1 . . . shot N, where N is a positive integer number) while the bit=0. A shot, as used herein, refers to single execution of a quantum algorithm on a quantum processing unit (e.g., quantum processor 108).

In step 702, measurement engine 201 of classical computer 102 measures the crosstalk error of the dynamic quantum circuit (e.g., quantum circuit 109).

As stated above, in one embodiment, measurement engine 201 measures the crosstalk error of the dynamic quantum circuit by gate set tomography, which is employed for crosstalk error characterization that involves the reconstruction of the full quantum state through a series of measurements. In one embodiment, the gate set tomography is implemented by running a series of two-qubit quantum circuits with parallel, single-qubit gates in each layer. The measured results are then used to fit models, such as crosstalk-free models that assume that each gate can be described by a single-qubit process matrix.

In another embodiment, measurement engine 201 measures the crosstalk error of the dynamic quantum circuit (e.g., quantum circuit 109) using randomized benchmarking and simultaneous randomized benchmarking protocols. In one embodiment, measurement engine 201 applies these protocols to experimental simulations on the dynamic quantum circuits to validate the presence of crosstalk. The dynamic of the crosstalk error models can be evaluated by comparing error variations among the dynamic quantum circuits.

In one embodiment, measurement engine 201 measures the crosstalk error of the dynamic quantum circuit (e.g., quantum circuit 109) using quantum detector tomography, which verifies noise in measurement readout errors. Such verified noise can be used to characterize and quantify the crosstalk error.

In one embodiment, measurement engine 201 measures the crosstalk error of the dynamic quantum circuit (e.g., quantum circuit 109) using quantum state tomography, which is employed for crosstalk error characterization that involves the reconstruction of the full quantum state through a series of measurements. In one embodiment, the quantum state tomography technique allows for a detailed examination of the density matrix, revealing crosstalk-induced deviations from the ideal quantum states.

In one embodiment, measurement engine 201 measures the crosstalk error of the dynamic quantum circuit (e.g., quantum circuit 109) using positive operator-valued measure (POVM) techniques by characterizing the measurement processes.

In step 703, measurement engine 201 of classical computer 102 adjusts a cost function to take into consideration the estimated idle time and the measured crosstalk error of the dynamic quantum circuit.

As discussed above, a cost function, as used herein, refers to a crosstalk aware cost function, which corresponds to a functional relationship between the cost and both the estimated idle time and the measured crosstalk error of the dynamic quantum circuit. Such a cost function is utilized to map the logical qubits (e.g., logical qubits 304) of the dynamic quantum circuit (e.g., quantum circuit 109) to the physical qubits (e.g., physical qubits 501) on the quantum device (e.g., quantum computer 101). In one embodiment, the cost function equals a default cost+(idle time of the dynamic quantum circuit)*(measured crosstalk error).

In one embodiment, measurement engine 201 modularly adds the idle time and the measured crosstalk error of the dynamic quantum circuit to a default cost to adjust the cost function. In one embodiment, the value of the default cost is user-designated.

In one embodiment, the value of the cost function scales with an amount of the idle time and the measured crosstalk error of the dynamic quantum circuit.

In step 704, mapping engine 202 of classical computer 102 maps the logical qubits of the dynamic quantum circuit to the physical qubits on the quantum device (e.g., quantum computer 101) based on the adjusted cost function.

As stated above, in one embodiment, the logical qubits of the dynamic quantum circuit are mapped to a particular layout of the physical qubits on the quantum device based on a particular value of the cost function as illustrated in FIG. 5.

Referring to FIG. 5, in conjunction with FIG. 3B, logical qubits 304 of dynamic quantum circuit 300' are mapped to a particular layout 500 of physical qubits 501 on the quantum device (e.g., quantum device 101) based on a particular value of the cost function.

In one embodiment, such a mapping is performed by mapping engine 202 based on a series of layouts 500 of physical qubits 501 associated with various values of the cost function. In one embodiment, mappings between the layouts 500 of physical qubits 501 and the values of the cost function are stored in a data structure (e.g., table). In one embodiment, mapping engine 202 accesses such a data structure to identify a particular layout 500 of physical qubits 501 based on a value of the cost function in order to map logical qubits 304 of dynamic quantum circuit 300' to a particular layout 500 of physical qubits 501 on the quantum device (e.g., quantum device 101). In one embodiment, such a data structure resides within the storage device (e.g., storage device 611, 615) of classical computer 102. In one embodiment, such a data structure is populated by an expert.

In this manner, qubit mapping is performed by taking into consideration the crosstalk errors in dynamic quantum circuits.

Furthermore, the principles of the present disclosure improve the technology or technical field involving qubit mapping.

As discussed above, dynamic quantum circuits are a fundamental part of utility-scale quantum computation (quantum utility is when a quantum computer is able to perform reliable computations at a scale beyond brute force classical computing methods that provide exact solutions to computational problems), ranging from generating long-range entanglement more efficiently to executing core algorithmic primitives (e.g., quantum Fourier transform) to the foundation of active quantum error correction. Unfortunately, dynamic quantum circuits are susceptible to certain types of errors, such as crosstalk errors, due to idle times introduced by mid-circuit measurements. Such crosstalk errors due to these idle times are especially damaging to state fidelity (measure of how closely a state or operation matches its intended or ideal state or operation) when qubits are neighboring each other. For example, state fidelity decreases when there are crosstalk errors. Crosstalk error in quantum computing refers to unwanted interaction or interference between qubits, such as during quantum operations. It arises from the imperfect isolation of quantum components, and it leads to unintended effects on neighboring qubits, thereby compromising the fidelity of quantum computations. There exists many approaches for suppressing the crosstalk errors in dynamic quantum circuits, such as through custom dynamical decoupling pulses. Dynamical decoupling pulses are a series of instantaneous control pulses that are applied periodically to idle qubits. The pulses flip the qubits around the Bloch sphere, which cancels out the effects of noise channels and suppresses decoherence. However, such approaches do not prevent crosstalk errors from negatively affecting qubit mapping. Qubit mapping involves mapping the logical qubits of the quantum circuit to the physical qubits on the quantum device. Qubit mapping is used to address the connectivity constraints of modern quantum computing devices. For example, when a quantum algorithm involves a quantum operation between two non-adjacent qubits, a long sequence of swap operations may need to be performed to bring the computation to a pair of adjacent qubits. As a result, logical qubits of the quantum circuit are mapped to the physical qubits on the quantum device so as to address the connectivity constraints of modern quantum computing devices. Unfortunately, current qubit mapping techniques do not consider crosstalk errors in dynamic quantum circuits, which as discussed above, are damaging to state fidelity when qubits are neighboring each other.

Embodiments of the present disclosure improve such technology by adjusting a cost function by taking into consideration the estimated idle time and the measured crosstalk error of the dynamic quantum circuit. A cost function, as used herein, refers to a crosstalk aware cost function, which corresponds to a functional relationship between the cost and both the estimated idle time and the measured crosstalk error of the dynamic quantum circuit. Such a cost function is utilized to map the logical qubits of the dynamic quantum circuit and the physical qubits on the quantum device. In one embodiment, the cost function equals a default cost+(idle time of the dynamic quantum circuit)*(measured crosstalk error). In one embodiment, the idle time and the measured crosstalk error of the dynamic quantum circuit are modularly added to a default cost to adjust the cost function. The logical qubits of the dynamic quantum circuit are then mapped to the physical qubits on the quantum device based on the adjusted cost function. For example, the logical qubits of the dynamic quantum circuit are mapped to a particular layout of the physical qubits on the quantum device based on a particular value of the cost function. In this manner, qubit mapping is performed by taking into consideration the crosstalk errors in dynamic quantum circuits. Furthermore, in this manner, there is an improvement in the technical field involving qubit mapping.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for performing qubit mapping taking into consideration crosstalk errors in dynamic quantum circuits, the method comprising:

adjusting a cost function to take into consideration an idle time and a crosstalk error of a dynamic quantum circuit; and mapping logical qubits of said dynamic quantum circuit to physical qubits on a quantum device based on said adjusted cost function.

2. The method as recited in claim 1 further comprising:

estimating said idle time of said dynamic quantum circuit during pre-scheduling of said dynamic quantum circuit.

3. The method as recited in claim 2, wherein said idle time of said dynamic quantum circuit is estimated using stored reference values of a readout time, a readout delay, and a feed-forward time during said pre-scheduling of said dynamic quantum circuit.

4. The method as recited in claim 1 further comprising:

estimating said idle time of said dynamic quantum circuit based on sampling different quantum trajectories and averaging total neighboring idle times.

5. The method as recited in claim 1 further comprising:

measuring said crosstalk error of said dynamic quantum circuit.

6. The method as recited in claim 1, wherein a value of said cost function scales with an amount of said idle time and said crosstalk error of said dynamic quantum circuit, wherein said logical qubits of said dynamic quantum circuit are mapped to a particular layout of said physical qubits on said quantum device based on a particular value of said cost function.

7. The method as recited in claim 1, wherein said idle time and said crosstalk error of said dynamic quantum circuit are added to a default cost to adjust said cost function.

8. A computer program product for performing qubit mapping taking into consideration crosstalk errors in dynamic quantum circuits, the computer program product comprising one or more computer readable storage mediums having program code embodied therewith, the program code comprising programming instructions for:

adjusting a cost function to take into consideration an idle time and a crosstalk error of a dynamic quantum circuit; and mapping logical qubits of said dynamic quantum circuit to physical qubits on a quantum device based on said adjusted cost function.

9. The computer program product as recited in claim 8, wherein the program code further comprises the programming instructions for:

estimating said idle time of said dynamic quantum circuit during pre-scheduling of said dynamic quantum circuit.

10. The computer program product as recited in claim 9, wherein said idle time of said dynamic quantum circuit is estimated using stored reference values of a readout time, a readout delay, and a feed-forward time during said pre-scheduling of said dynamic quantum circuit.

11. The computer program product as recited in claim 8, wherein the program code further comprises the programming instructions for:

estimating said idle time of said dynamic quantum circuit based on sampling different quantum trajectories and averaging total neighboring idle times.

12. The computer program product as recited in claim 8, wherein the program code further comprises the programming instructions for:

measuring said crosstalk error of said dynamic quantum circuit.

13. The computer program product as recited in claim 8, wherein a value of said cost function scales with an amount of said idle time and said crosstalk error of said dynamic quantum circuit, wherein said logical qubits of said dynamic quantum circuit are mapped to a particular layout of said physical qubits on said quantum device based on a particular value of said cost function.

14. The computer program product as recited in claim 8, wherein said idle time and said crosstalk error of said dynamic quantum circuit are added to a default cost to adjust said cost function.

15. A system, comprising:

a memory for storing a computer program for performing qubit mapping taking into consideration crosstalk errors in dynamic quantum circuits; and a processor connected to said memory, wherein said processor is configured to execute program instructions of the computer program comprising:

adjusting a cost function to take into consideration an idle time and a crosstalk error of a dynamic quantum circuit; and mapping logical qubits of said dynamic quantum circuit to physical qubits on a quantum device based on said adjusted cost function.

16. The system as recited in claim 15, wherein the program instructions of the computer program further comprise:

estimating said idle time of said dynamic quantum circuit during pre-scheduling of said dynamic quantum circuit.

17. The system as recited in claim 16, wherein said idle time of said dynamic quantum circuit is estimated using stored reference values of a readout time, a readout delay, and a feed-forward time during said pre-scheduling of said dynamic quantum circuit.

18. The system as recited in claim 15, wherein the program instructions of the computer program further comprise:

estimating said idle time of said dynamic quantum circuit based on sampling different quantum trajectories and averaging total neighboring idle times.

19. The system as recited in claim 15, wherein the program instructions of the computer program further comprise:

measuring said crosstalk error of said dynamic quantum circuit.

20. The system as recited in claim 15, wherein a value of said cost function scales with an amount of said idle time and said crosstalk error of said dynamic quantum circuit, wherein said logical qubits of said dynamic quantum circuit are mapped to a particular layout of said physical qubits on said quantum device based on a particular value of said cost function.

* * * * *